United States Patent
Lee et al.

(10) Patent No.: US 9,416,327 B2
(45) Date of Patent: Aug. 16, 2016

(54) HYBRID GASIFICATION SYSTEM

(71) Applicant: KOREA INSTITUTE OF INDUSTRIAL TECHNOLOGY, Chungcheongnam-do (KR)

(72) Inventors: Uen Do Lee, Daejeon (KR); Wong Yang, Gyeonggi-do (KR); Dong Ho Park, Gyeonggi-do (KR); Jeong Woo Lee, Daejeon (KR); Young Doo Kim, Seoul (KR); Ji Hong Moon, Gwangju (KR); Kwang Soo Kim, Chungcheongnam-do (KR); Chang Won Yang, Incheon (KR); Beom Jong Kim, Gyeonggi-do (KR)

(73) Assignee: Korea Institute of Industrial Technology, Chungcheongnam-Do (KR)

( * ) Notice: Subject to any disclaimer, the term of this patent is extended or adjusted under 35 U.S.C. 154(b) by 175 days.

(21) Appl. No.: 14/366,007

(22) PCT Filed: Dec. 21, 2012

(86) PCT No.: PCT/KR2012/011330
§ 371 (c)(1),
(2) Date: Jun. 17, 2014

(87) PCT Pub. No.: WO2013/095073
PCT Pub. Date: Jun. 27, 2013

(65) Prior Publication Data
US 2014/0314629 A1    Oct. 23, 2014

(30) Foreign Application Priority Data

Dec. 21, 2011    (KR) .................. 10-2011-0138965

(51) Int. Cl.
*C10J 3/56*    (2006.01)
*C10J 3/48*    (2006.01)
*C10J 3/84*    (2006.01)
*C10J 3/72*    (2006.01)

(52) U.S. Cl.
CPC .... *C10J 3/56* (2013.01); *C10J 3/48* (2013.01); *C10J 3/482* (2013.01); *C10J 3/485* (2013.01); *C10J 3/721* (2013.01); *C10J 3/84* (2013.01); *C10J 2300/093* (2013.01); *C10J 2300/0916* (2013.01); *C10J 2300/0946* (2013.01); *C10J 2300/0956* (2013.01); *C10J 2300/0993* (2013.01); *Y02P 20/145* (2015.11)

(58) Field of Classification Search
CPC ................... C10J 3/482; C10J 3/485
See application file for complete search history.

(56) References Cited

U.S. PATENT DOCUMENTS 3,840,354 A * 10/1974 Donath .................. C07C 1/02
48/202
4,823,712 A    4/1989 Wormer

FOREIGN PATENT DOCUMENTS

WO    2010075536 A1    1/2010

*Primary Examiner* — Matthew Merkling
(74) *Attorney, Agent, or Firm* — McNees Wallace & Nurick LLC

(57) ABSTRACT

The present invention provides a hybrid gasification system which simultaneously has the advantages of an entrained-flow gasifier using pulverized fuel and a fluidized-bed gasifier utilized for gasifying fuel with relatively various properties. The present intention provides a hybrid gasification system employing a structure in which a second reaction chamber operated at a temperature of 700 to 900 is surrounded by a first reaction chamber operated at temperature, thereby obtaining an insulation effect, performing additional heat exchange, and minimizing a heat loss. Furthermore, the present invention provides a hybrid gasification system having a structure in which unreacted substances and tar within synthetic gas generated from a first reaction chamber reacts within a second reaction chamber, thereby increasing the entire gasification efficiency.

5 Claims, 5 Drawing Sheets

HYBRID GASIFICATION SYSTEM

TECHNICAL FIELD

The present invention relates to a hybrid gasification system, and more particularly, to a hybrid gasification system which simultaneously has the advantages of entrained-flow gasifier using pulverized fuel and a fluidized-bed gasifier utilized for gasifying fuel with relatively various properties.

BACKGROUND ART

The continuous reduction in reserves of fossil fuels (coal, oil, and natural gas) and the environmental pollution caused by use of fossil fuel directly threaten the survival and development of the human race. Thus, various countries' attentions are being paid to the development of renewable and environment-friendly energy.

Bio-mass is an organic material derived through photosynthesis of a plant. Since bio-mass is widely distributed and used, is cleaner than fossil fuel, and generates no CO2, bio-mass attracts much attention as an important renewable energy. Bio-mass can be converted into synthetic gas or liquefied fuel through such a method as thermal chemistry or biochemistry, and can be applied to power generation, industrial fuel, or chemical industry products. Thus, bio-mass may replace a considerable amount of fossil fuel without changing the existing energy conversion systems. Therefore, bio-mass is being preferentially developed by various countries.

Bio-mass may be converted into synthetic gas or liquefied fuel through various kinds of methods, and the bio-mass gasification technology is viable for a larger number of types of available bio-masses and has greater expandability than other technologies.

The gasification process for bio-mass is performed through a thermal-chemistry conversion process in which a solid bio-mass material and a gasification agent (air, oxygen, vapor, or carbon dioxide) produce a chemical reaction under a high-temperature condition such that the solid bio-mass material is converted into a gas mixture based on hydrocarbon containing carbon, hydrogen, and oxygen. The gas mixture is typically referred to as synthetic gas.

The composition of the synthetic gas generated during the gasification process may be primarily influenced by the material characteristics of the bio-mass used during the gasification process, and differ depending on the type of the gasification agent, the type of a gasifier, and the reaction condition of temperature and pressure. The basic purpose of gasification is to obtain a desired synthetic gas composition, reduce the content of tar oil during the gasification, and maximize the gasification efficiency of the system, the carbon conversion rate, and the content of CO and H2 in the synthetic gas.

In order to accomplish the above-described purpose, an entrained-flow flow gasifier and a fluidized-bed gasifier are provided.

The entrained-flow gasifier sprays pulverized fuel in several tens to hundreds of m with an oxidizing agent so as to form a high-temperature combustion zone at 1,600 degrees or more, and injects a large amount of pulverized fuel around the high-temperature combustion zone so as to perform gasification. The entrained-flow gasifier is mainly utilized for gasifying coal which may be easily pulverized, but bio-mass, bio-mass char, and pre-processed high water content bio-mass (dried sewage sludge) may be pulverized and utilized. Since the entrained-flow gasifier has a simple structure, the entrained-flow gasifier may be easily applied to a pressurized gasification system which can be operated at high pressure.

The fluidized-bed gasifier may use fuel in several mm to several cm, and use sand as a heat medium and a fluidizing material. Thus, the fluidized-bed gasifier is utilized for gasifying a waste material having various properties and a low heat value (or a significant variation in heat value), bio-mass, and low-grade coal which cannot be utilized as pulverized fuel.

In order to operate the fluidized-bed gasifier, gas with a predetermined pressure, a predetermined flow rate, and a predetermined temperature or more is required for fluidization, and a fluidized-bed gasification agent is supplied through a distributor so as to perform gasification.

The synthetic gas generated from the gasification system is refined and used as fuel or utilized for producing a chemical material through a catalyst conversion process. During this process, it is necessary to treat tar, unburned matter, or dust which may be formed within the synthetic gas.

During the refining process, however, the synthetic gas is cooled down. At this time, sensible heat escaping during the refining process may be reused through waste heat recovery, but waste heat recovery efficiency is not very high.

DISCLOSURE

Technical Problem

The present invention is made by recognizing at least any one of demands or problems which occur in the related art as described above.

An aspect of the present invention provides a hybrid gasification system which simultaneously has the advantages of an entrained-flow gasifier and a fluidized-bed gasifier, supplies high-temperature synthetic gas produced through entrained-flow gasification to an fluidized-bed gasifier through a distributor, and utilizes the synthetic gas as a gasification agent of a fluidized-bed reactor.

Another aspect of the present invention provides a hybrid gasification system employing a structure in which a second reaction chamber operated at a temperature of 700 to 900 is surrounded by a first reaction chamber operated at high temperature, thereby minimizing heat loss.

Another aspect of the present invention provides a hybrid gasification system having a structure in which unreacted substances and tar within synthetic gas generated from a first reaction chamber reacts within a second reaction chamber, thereby increasing the entire gasification efficiency.

Another aspect of the present invention provides a fluidized-bed reactor provided at the bottom of an entrained flow gasifier and additionally reacts unreacted substances generated from a first reaction chamber, thereby increasing a carbon conversion rate.

Technical Solution

A hybrid gasification system in accordance with an embodiment of the present invention to realize at least one of the above problems may include the following features.

According to one aspect of the present invention, a hybrid gasification system may include: a hollow gasifier; a first reaction chamber positioned in the center of the gasifier; a second reaction chamber positioned to surround the first reaction chamber within the gasifier; and a synthetic gas transfer part positioned at the bottom of the first and second reaction chambers. Pulverized fuel introduced into the first reaction chamber through a pulverized fuel injection pipe may be converted into synthetic gas through the first reaction chamber.

The hybrid gasification system may further include a first distributor positioned at the bottom of the second reaction chamber, and the synthetic gas generated from the first reaction chamber may be introduced to the second reaction chamber through the first distributor.

The hybrid gasification system may further include a fluidized-bed reactor positioned under the synthetic gas transfer part within the gasifier and having a second distributor formed therein.

The fluidized-bed reactor may cause a reaction to convert unreacted substances remaining in the synthetic gas transfer part into the synthetic gas through the second distributor.

The hybrid gasification system may further include: a synthetic gas discharge pipe communicating with the top surface of the gasifier; and a solid waste injection pipe communicating with side and bottom surfaces of the gasifier so as to inject solid wastes. The synthetic gas discharge pipe may discharge the synthetic gas within the second reaction chamber to the outside of the gasifier.

The hybrid gasification system may further include a circulation flow path part communicating with the second reaction chamber and including a circulation flow path. One side of the circulation flow path may be inserted into a first through-hole formed at the top of the second reaction chamber, and the other side of the circulation flow path may be inserted into a second through-hole formed at the side of the second reaction chamber.

The circulation flow path part may further include: a discharge pipe communicating with the outside; and an air nozzle supplying a gasification agent into the circulation flow path part, wherein the synthetic gas within the second reaction chamber is sequentially circulated through the second through-hole, the circulation flow path, and the first through-hole, and then discharged to the outside through the discharge pipe.

Advantageous Effects

According to the embodiments of the present invention, the hybrid gasification system has the advantages of an entrained-flow gasifier and a fluidized-bed gasifier, and supplies high-temperature synthetic gas produced within the entrained-flow gasifier to the fluidized-bed gasifier through the distributor such that sensible heat of the high-temperature synthetic gas produced from entrained-flow gasifier is utilized in the fluidized bed gasifier, thereby increasing thermal efficiency.

Furthermore, it is possible to provide a hybrid gasification system employing a structure in which a second reaction chamber operated at a temperature of 700 to 900 is surrounded by a first reaction chamber operated at high temperature, thereby obtaining an insulation effect, performing additional heat exchange, and minimizing a heat loss.

Furthermore, it is possible to provide a hybrid gasification system which includes the fluidized-bed reactor provided at the bottom of the entrained-flow gasifier and additionally reacts unreacted substances generated from a first reaction chamber, thereby increasing a carbon conversion rate.

Furthermore, while the synthetic gas produced through the entrained-flow gasifier passes through the fluidized-bed gasifier, an additional gasification reaction occurs to refine tar and dust.

Furthermore, when a material suitable for decomposing tar, such as dolomite or olivine, is used as a fluidization material instead of sand, an additional refinement effect may be acquired.

Furthermore, when coal, waste, and biomass are mixed and gasified, the gas mixture may supplement the material characteristics of waste and bio-mass which have a variation in supply.

MODE FOR INVENTION

Figure 1:
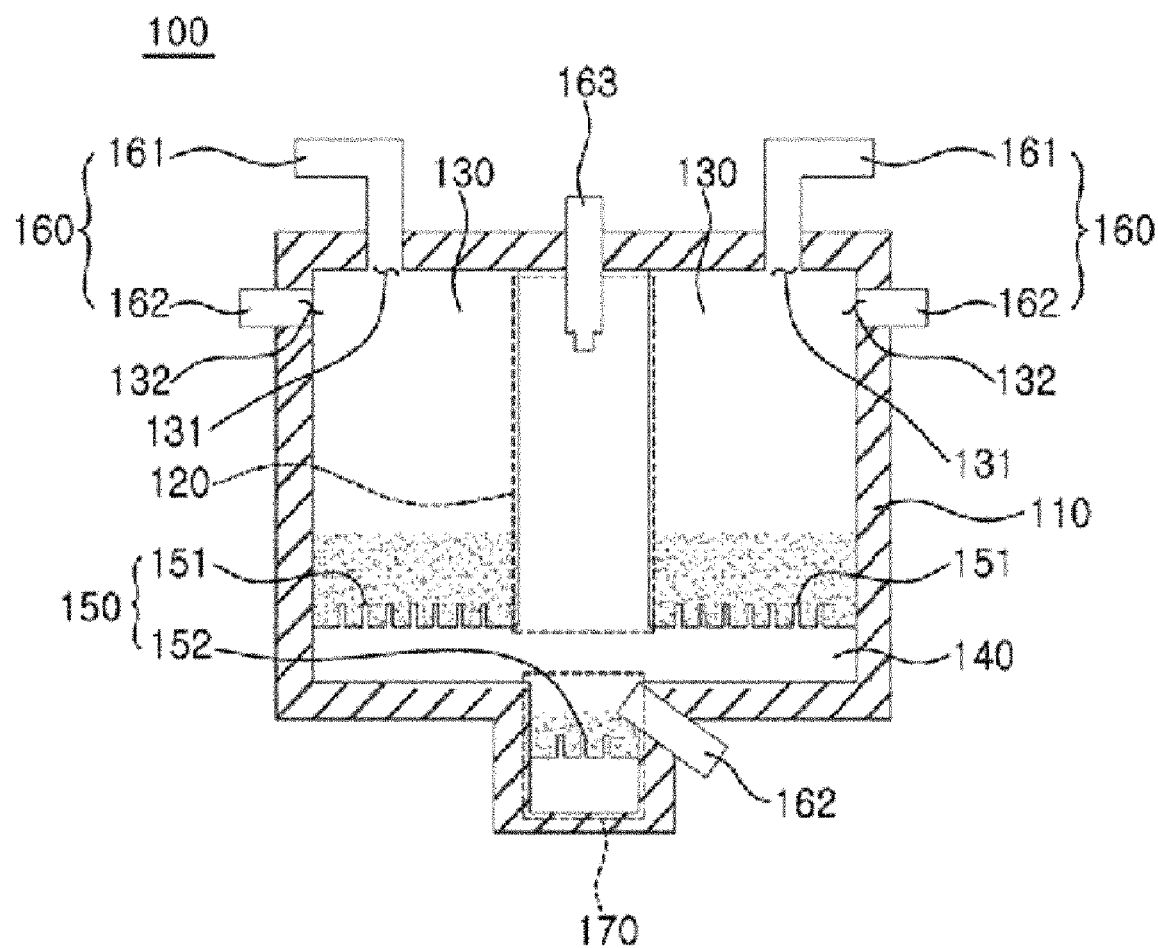
FIG. 1 is a cross-sectional view of a hybrid gasification system in accordance with a first embodiment of the present invention, when seen from one direction.

Elements included in a hybrid gasification system in accordance with an embodiment of the present invention may be used integrally or separately, if necessary. Furthermore, a part of the elements may be omitted depending on the intended use.

Hereafter, hybrid gasification systems 100 in accordance with embodiments of the present invention will be described with reference to FIGS. 1 to 5. In the drawings, the thickness of lines or the size of elements may be exaggerated for clarity of illustration. Furthermore, terms used herein are terms defined in consideration of functions in the present invention, and may differ depending on a user or operator's intention or custom. Thus, the definitions of the terms will be determined on the basis of the content of the present specification.

Figure 2:
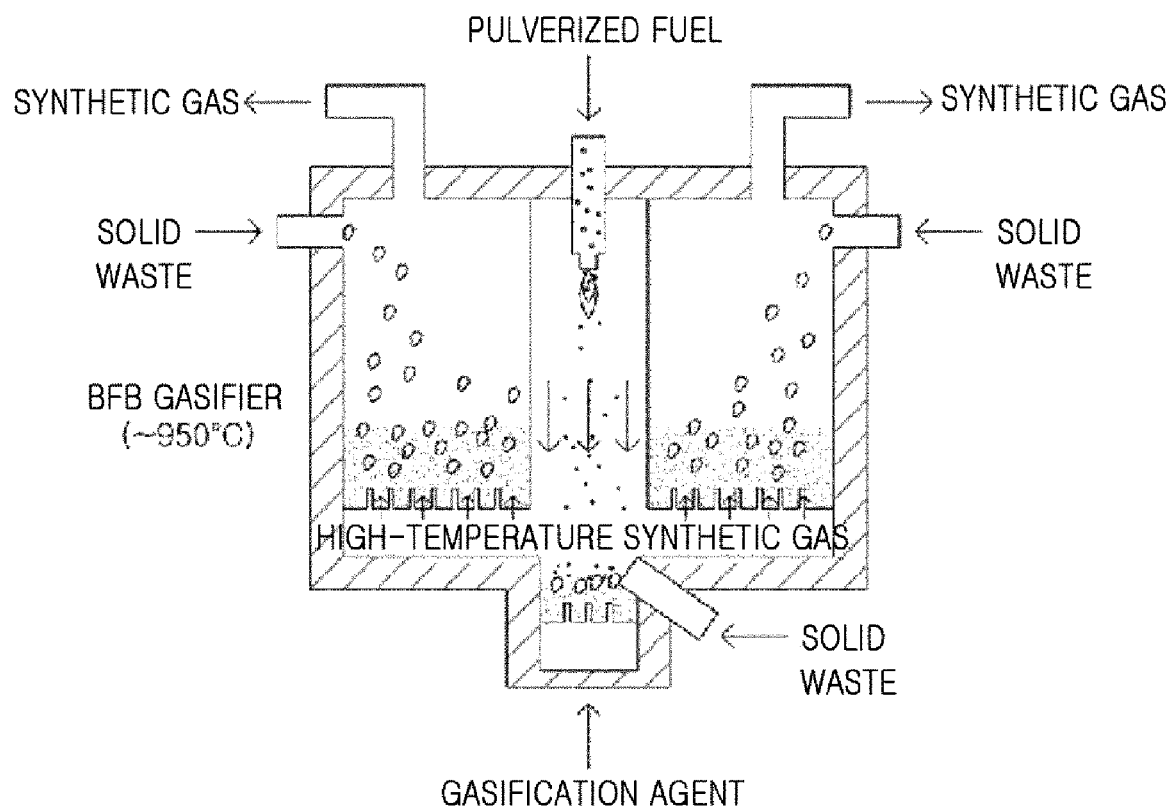
FIG. 2 is a flow diagram illustrating a bubbling fluidized bed of waste and pulverized fuel, which are inputted into a combustion furnace of FIG. 1, and synthetic gas.
Figure 3:
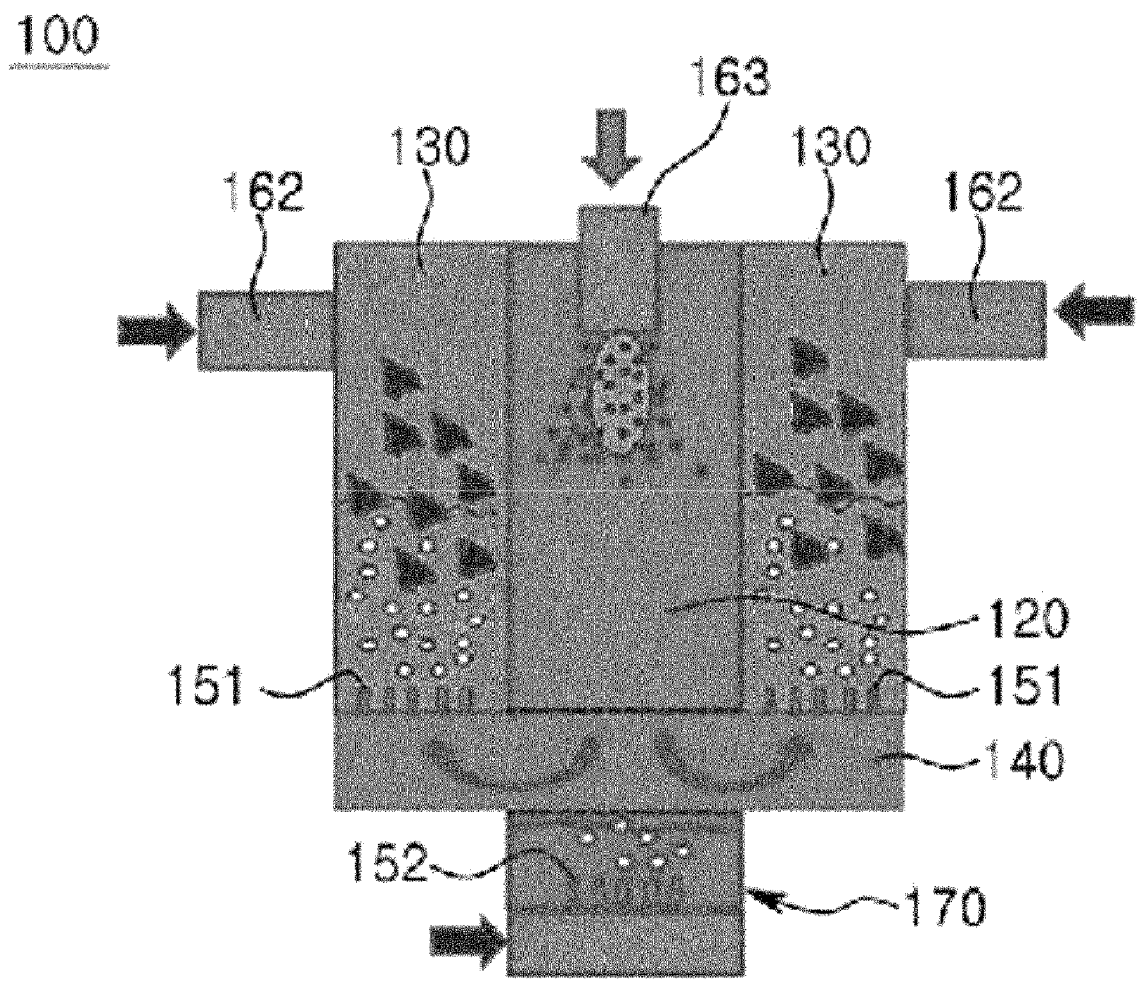
FIG. 3 is a schematic view of FIG. 1.

Referring to FIGS. 1 to 3, a hybrid gasification system 100 in accordance with a first embodiment of the present invention will be described.

The hybrid gasification system 100 in accordance with the first embodiment of the present invention includes a hollow gasifier 110, a first reaction chamber 120, a second reaction chamber 130, a synthetic gas transfer part 140, a distributor 150, a communication part 160, and a fluidized-bed reactor 170. The first reaction chamber 120 is positioned in the center of the gasifier 110. The second reaction chamber 130 is positioned to surround the first reaction chamber 120 within the gasifier 110. The synthetic gas transfer part 140 is positioned under the first and second reaction chambers 120 and 130. The distributor 150 is positioned at the bottom of the gasifier 110. The communication part 160 communicates with the second reaction chamber 130. The fluidized-bed reactor 170 is positioned under the synthetic gas transfer part 140 within the gasifier 110.

The gasifier 110 has a hollow structure, and may be manufactured to endure high pressure because high-pressure synthetic gas flows within the gasifier 110. Furthermore, the gasifier 110 has a structure communicating with the outside, and the structure will be described below in more detail.

The first reaction chamber 120 is positioned in the center of the gasifier 110, and a pulverized fuel injection pipe 163 to be described below is positioned at the top of the first reaction chamber 120. Inside the first reaction chamber 120, pulverized fuel is introduced through the pulverized fuel injection pipe 163 and converted into synthetic gas.

The second reaction chamber 130 is positioned to surround the first reaction chamber 120 inside the gasifier 110. The second reaction chamber 130 includes a first through-hole 131 positioned at one side of the top surface thereof and a second through-hole 132 positioned at the upper part of a side surface thereof.

As illustrated in FIG. 1, the first through-hole 131 serves to discharge the synthetic gas generated from the second reaction chamber 130 to the outside.

The second through-hole 132 serves as a path for supplying solid waste to the second reaction chamber 130.

The synthetic gas transfer part 140 is positioned under the first and second reaction chambers 120 and 130. As the synthetic gas transfer part 140 is configured to communicate with the first and second reaction chambers 120 and 130, the synthetic gas generated from the first reaction chamber 120 may be introduced to the synthetic gas transfer part 140.

The synthetic gas transfer part 140 serves to transfer the introduced synthetic gas to the second reaction chamber 130.

The distributor 150 includes a first distributor 151 positioned at the bottom of the second reaction chamber 130 and a second distributor 152 positioned at the bottom of the fluidized-bed reactor 170.

The synthetic gas, which is generated from the first reaction chamber 120 and transferred through the synthetic gas transfer part 140, is pulverized and introduced into the first distributor 151.

The first distributor 151 serves to prevent unreacted pulverized fuel from flowing into the second reaction chamber 130 and thus induce a reaction.

The second distributor 152 is positioned in the center of the fluidized-bed reactor 170, and plays the same role as the first distributor 151.

In other words, the second distributor 152 pulverizes unreacted fuel falling from the synthetic gas transfer part 140 into an aerosol state, and supplies the pulverized fuel to the synthetic gas transfer part 140.

The communication part 160 communicates with the second reaction chamber 130, and includes a synthetic gas discharge pipe 161, a solid waste injection pipe 162, and a pulverized fuel inject ion pipe 163. The synthetic gas discharge pipe 161 communicates with the top surface of the gasifier 110, the solid waste injection pipe 162 communicates with the side surface and the bottom surface of the gasifier 110 so as to inject solid waste, and the pulverized injection pipe 163 is positioned in the top center of the gasifier 110.

The synthetic gas discharge pipe 161 communicates with the top surface of the gasifier 110. More specifically, the synthetic gas discharge pipe 161 serves as a discharge port to discharge the synthetic gas within the second reaction chamber 130 to the outside of the gasifier 110.

The solid waste injection pipe 162 communicates with the side surface and the bottom surface of the gasifier 110 so as to inject solid waste, and the solid waste injection pipe 162 injects solid waste into the second reaction chamber 130 and the fluidized-bed reactor 170 within the gasifier 110.

The pulverized fuel injection pipe 163 is positioned in the top center of the gasifier 110, and serves as a path through which the pulverized fuel supplied from outside is introduced into the first reaction chamber 120.

The fluidized-bed reactor 170 is positioned at the bottom of the synthetic gas transfer part 140 within the gasifier 110. The fluidized-bed reactor 170 serves to convert unreacted substances remaining in the synthetic gas transfer part 140 into synthetic gas through the second distributor 152.

The hybrid gasification system in accordance with the first embodiment of the present invention is configured in a bubbling fluidized bed (BFB) and thus favorable to small and medium-scale systems.

Figure 4:
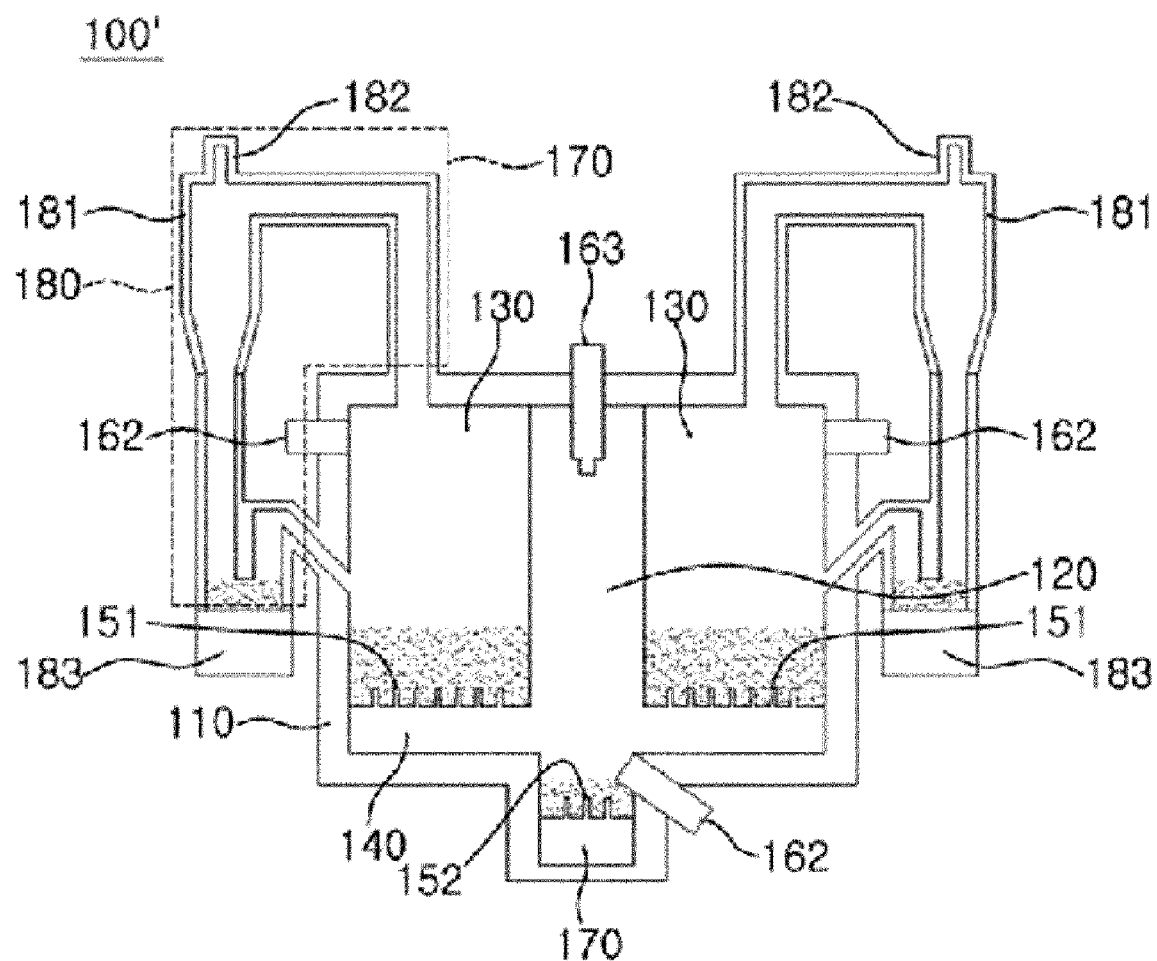
FIG. 4 is a cross-sectional view of a hybrid gasification system in accordance with a second embodiment of the present invention, when seen from one direction.
Figure 5:
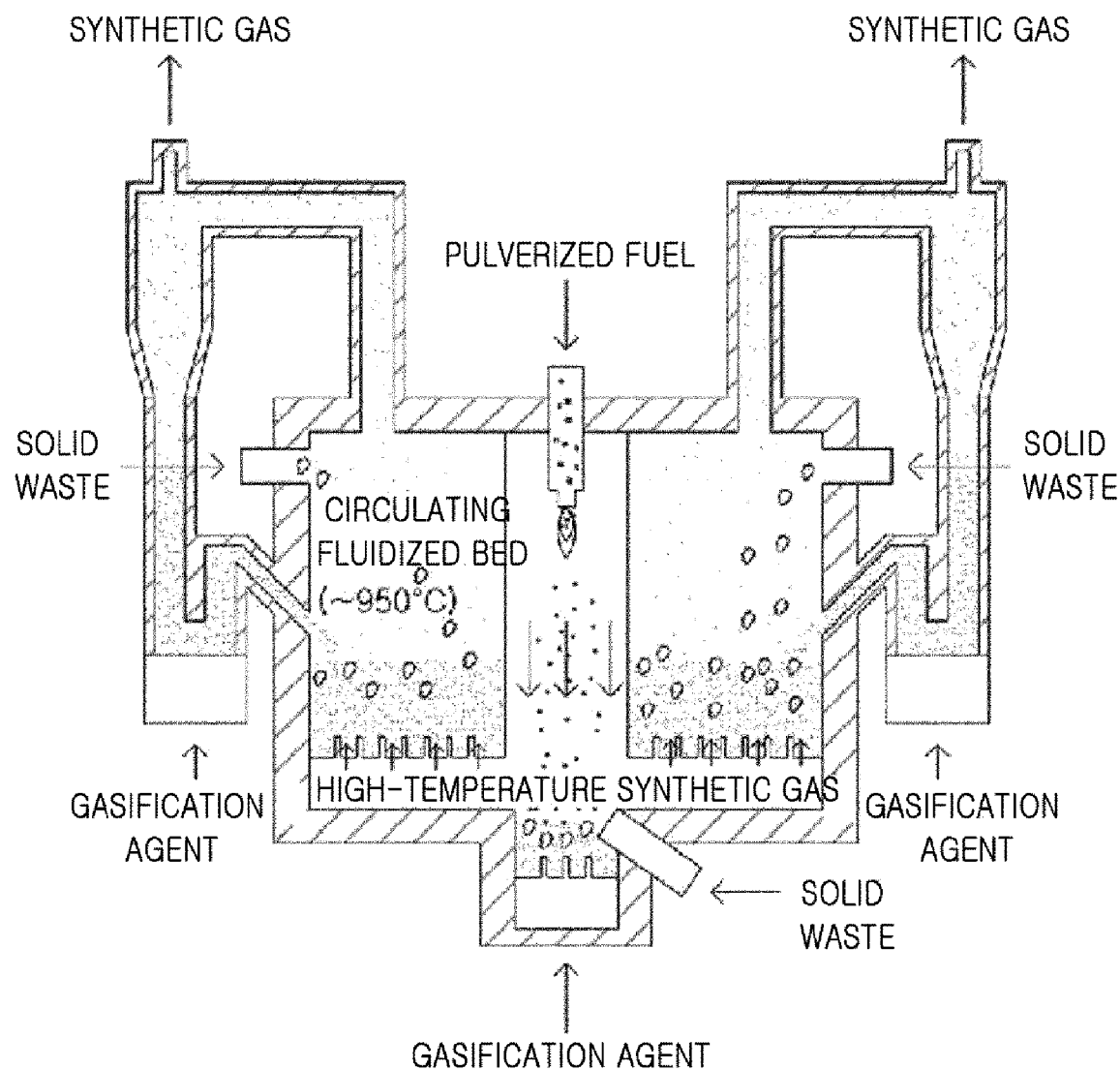
FIG. 5 is a flow diagram illustrating a circulating fluidized bed of waste and pulverized fuel, which are inputted into a combustion furnace of FIG. 4, and synthetic gas.

Hereafter, a hybrid gasification system 100' in accordance with a second embodiment of the present invention will be described with reference to FIG. 4. At this time, the detailed descriptions of the same elements as those of the first embodiment are omitted, and additional elements will be described in detail.

The hybrid gasification system 100' in accordance with the second embodiment of the present invention includes a gasifier 110, a first reaction chamber 120, a second reaction chamber 130, a synthetic gas transfer part 140, a distributor 150, a fluidized-bed reactor 170, and a circulation flow path part 180 communicating with the second reaction chamber 130.

The hybrid gasification system 100' in accordance with the second embodiment of the present invention may further include the above-described solid waste injection pipe 162.

The circulation flow path part 170 includes a circulation flow path 181 connecting first and second through-holes 131 and 132, a discharge pipe 182 communicating with the top of the circulation flow path 181, and an air nozzle 183 communicating with the bottom of the circulation flow path 181.

One side of the circulation flow path 181 is inserted into the first through-hole 131 formed at the top of the second reaction chamber 130, and the other side of the circulation flow path 181 is inserted into the second through-hole 132 formed at the side of the second reaction chamber 130.

The discharge pipe 182 communicates with the top of the circulation flow path 181, and serves to discharge the synthetic gas within the first reaction chamber 120 to the outside of the gasifier 110, like the above-described synthetic gas discharge pipe 161.

The air nozzle 183 communicates with the bottom of the circulation flow path 181, and serves to supply a gasification agent to the discharge pipe 182 and the circulation flow path 181 which communicate with the outside, and adjust a circulation volume of solid waste.

In the second embodiment of the present invention, the synthetic gas within the second reaction chamber 130 is sequentially circulated through the second through-hole 132, the circulation flow path 181, and the first through-hole 131, and then discharged to the outside through the discharge pipe 182.

The first embodiment configured in a bubbling fluidized bed (BFB) type and the second embodiment configured in a circulating fluidized bed (CFB) type may be selected and used according to the purpose.

The hybrid gasification system in accordance with the second embodiment of the present invention is configured in a circulating fluidized bed (CFB) type, and this favorable to medium and large-scale systems.

As set forth above, the apparatus for injecting hot air into an electric furnace may not be restrictively applied to the foregoing embodiments, but all or a portion of each embodiment may be selectively combined so that the embodiments may be variously changed.

The invention claimed is:
1. A hybrid gasification system comprising:
a hollow gasifier;
a first reaction chamber positioned in the center of the gasifier;
a second reaction chamber positioned to surround the first reaction chamber within the gasifier;

a first distributor positioned at the bottom of the second reaction chamber; and a synthetic gas transfer part positioned at the bottom of the first and second reaction chambers, wherein pulverized fuel introduced into the first reaction chamber through a pulverized fuel injection pipe is converted into synthetic gas through the first reaction chamber, and the synthetic gas generated from the first reaction chamber is introduced to the second reaction chamber through the first distributor;

wherein the hybrid gasification system further comprises a fluidized-bed reactor positioned under the synthetic gas transfer part within the gasifier and having a second distributor formed therein.

2. The hybrid gasification system of claim 1, wherein the fluidized-bed reactor causes a reaction to convert unreacted substances remaining in the synthetic gas transfer part into the synthetic gas through the second distributor.

3. The hybrid gasification system of claim 1, further comprising:

a synthetic gas discharge pipe communicating with the top surface of the gasifier; and a solid waste injection pipe communicating with side and bottom surfaces of the gasifier so as to inject solid wastes, wherein the synthetic gas discharge pipe discharges the synthetic gas within the second reaction chamber to the outside of the gasifier.

4. The hybrid gasification system of claim 1 or 2, further comprising a circulation flow path part communicating with the second reaction chamber and comprising a circulation flow path, wherein one side of the circulation flow path is inserted into a first through-hole formed at the top of the second reaction chamber, and the other side of the circulation flow path is inserted into a second through-hole formed at the side of the second reaction chamber.

5. The hybrid gasification system of claim 4, wherein the circulation flow path part further comprises:

a discharge pipe communicating with the outside; and an air nozzle supplying a gasification agent into the circulation flow path part, wherein the synthetic gas within the second reaction chamber is sequentially circulated through the second through-hole, the circulation flow path, and the first through-hole, and then discharge to the outside through the discharge pipe.

* * * * *